F. J. LEMLEY.
FRICTION CLUTCH.
APPLICATION FILED JULY 16, 1912.
1,055,192.
Patented Mar. 4, 1913.
2 SHEETS—SHEET 1.
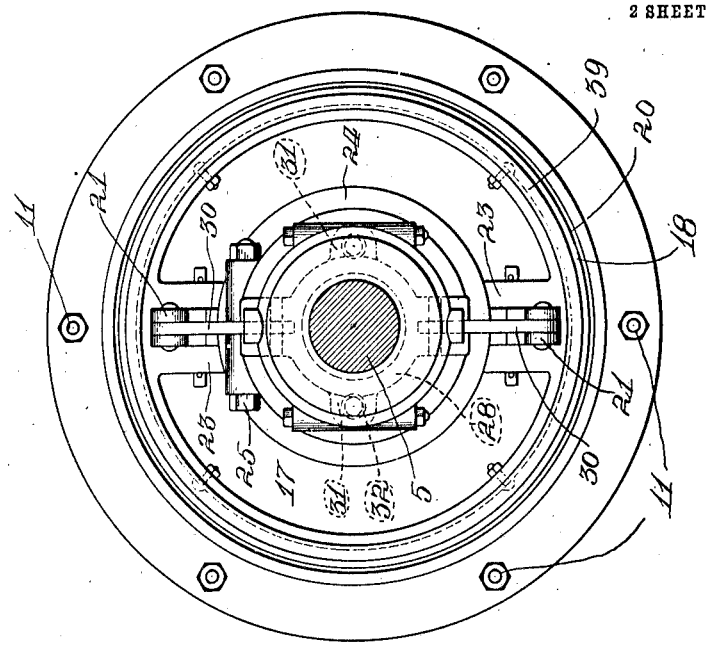
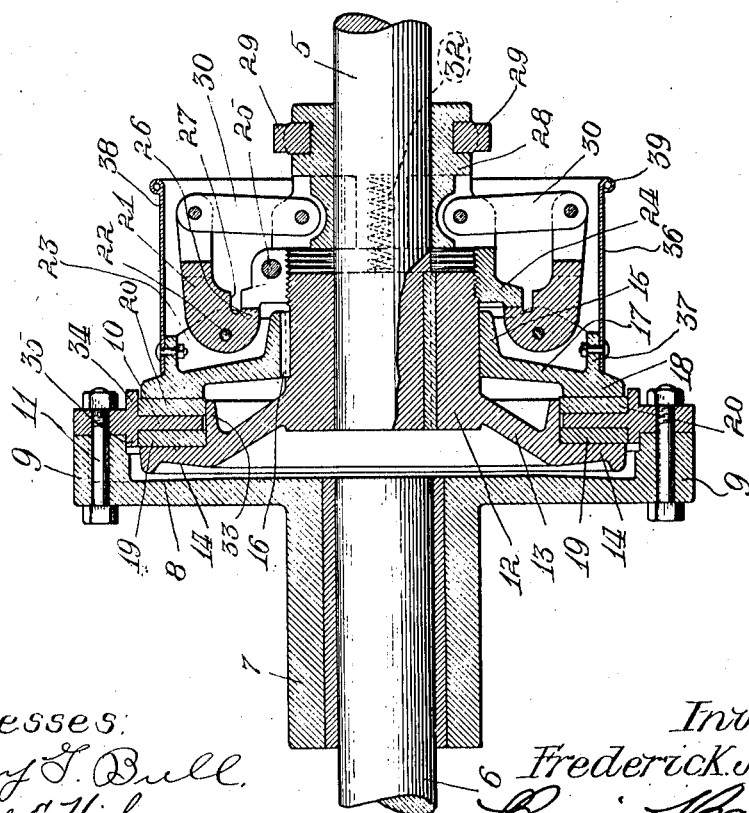
Witnesses:
Henry T. Bull.
George C. Higham.
Inventor:
Frederick J. Lemley,
by Bannin & Bannin
Attys.

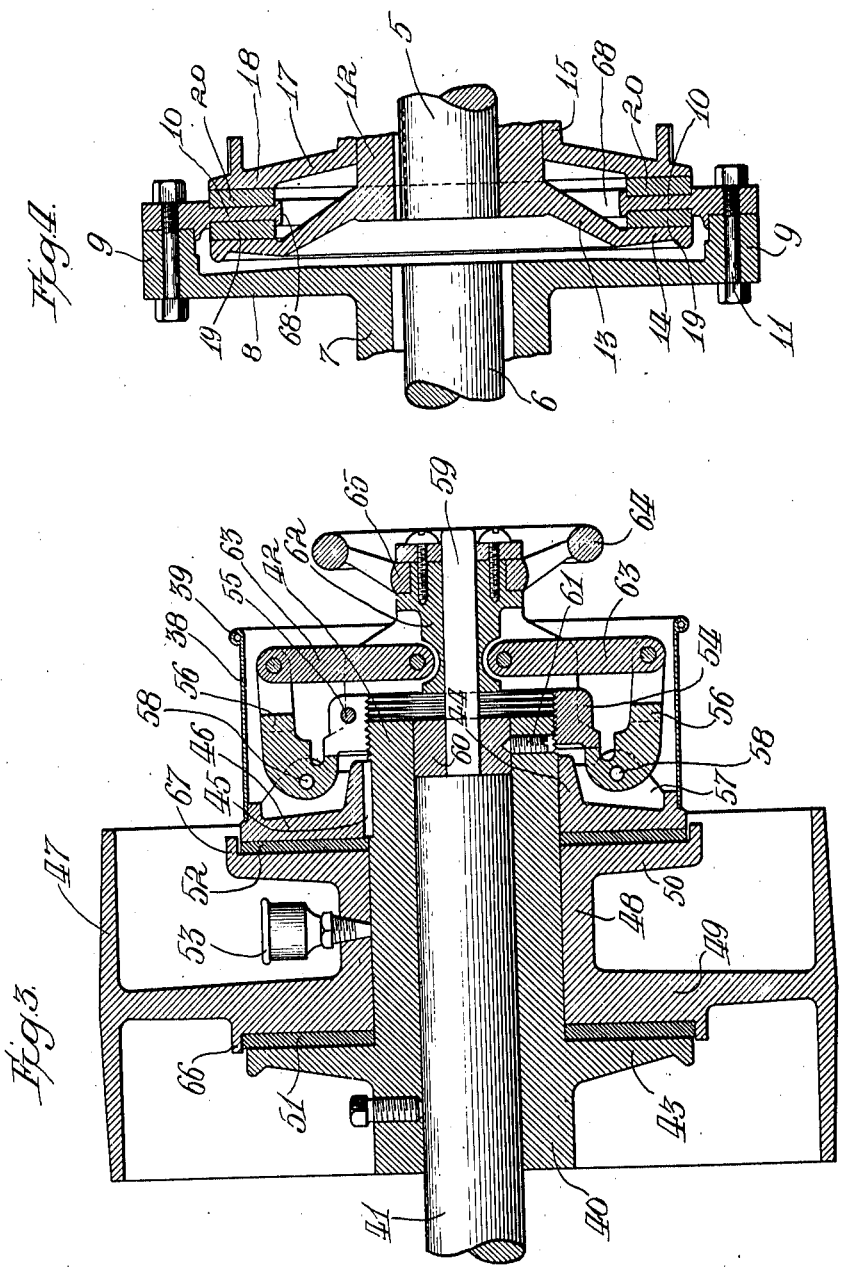

UNITED STATES PATENT OFFICE.

FREDERICK J. LEMLEY, OF CHICAGO, ILLINOIS.

FRICTION-CLUTCH.

1,055,192.　　　　Specification of Letters Patent.　　Patented Mar. 4, 1913.

Application filed July 16, 1912. Serial No. 709,694.

*To all whom it may concern:*

Be it known that I, FREDERICK J. LEMLEY, a citizen of the United States, residing at Chicago, in the county of Cook and State of Illinois, have invented new and useful Improvements in Friction - Clutches, of which the following is a specification.

The present invention relates to that type of friction clutch in which the gripping action is secured by forcing the friction surfaces together by some form of toggle, and in which the friction members are made of suitable substance, such as wood, fiber, composition, or other material. The wearing members of such a clutch must be replaced from time to time, but must be securely held in position when they have once been mounted in the clutch.

In clutch constructions heretofore used, as far as I am aware, it has been necessary to secure the wearing members, when they are made in sections of wood or other substance, to the rotating disks by means of rivets or the like, so that the expense and difficulty of their insertion or replacement has been comparatively large. In many cases, it is very difficult to gain access to these wearing members for such purpose, and consequently the cost and difficulty of their replacement is correspondingly increased.

One of the main objects of this invention is to provide a clutch of such construction as to inclose the wearing members so that they will be held in proper position by such inclosures without the necessity of using rivets or other like devices. In this way the cost of inserting or replacing the wearing members will be greatly reduced without in any way interfering with their proper operation. Furthermore, by inclosing them sufficiently to protect their friction surfaces, dust and other gritty matter will be largely prevented from gaining access to such surfaces, so that their useful life will be increased and their operation correspondingly improved.

Another object of this invention is to provide an inclosure for the toggles, of such construction as to largely prevent operators from being injured by the moving parts. At the same time the inclosure is not such a one as will interfere with easy access to the toggles, so that they can be easily adjusted or replaced notwithstanding the presence of the protecting inclosure.

Other objects and uses will appear from a detailed description of the invention which consists in the features of construction and combination of parts hereinafter described and claimed.

In the drawings, Figure 1 shows a cross section through the preferred construction of clutch, such a one as would be used on a straight line of shaft; Fig. 2 shows an end view of the clutch of Fig. 1; Fig. 3 shows a cross section through a modified form of clutch embodying the main features of this invention, and adapted for controlling the drive from the end of a shaft to a fly wheel or pulley, it being particularly adapted for use in connection with gasolene engines; and Fig. 4 shows a detail section through a portion of a modified construction of clutch.

I will first describe the construction illustrated in Figs. 1 and 2, and will then consider the modifications in Figs. 3 and 4, pointing out, however, those features in which all of the several constructions are the same.

In Figs. 1 and 2 a driving shaft, designated by the numeral 5, is adapted to drive a driven shaft 6 through the medium of the clutch when the same is thrown into operative position. A sleeve 7 keyed or otherwise secured to the driven shaft carries a disk 8, to the periphery 9 of which is secured an annular ring 10. The attachment of the ring 10 may be through the medium of bolts 11 or in any other suitable manner.

A sleeve 12 is keyed or otherwise secured to the driving shaft 5 and carries a disk 13 which has a gripping flange 14. A sleeve 15 is keyed to the sleeve 12 by means of a feather 16, so that said sleeve 15 can slide back and forth with respect to the sleeve 12, but is forced to rotate therewith. This sleeve 15 carries a disk 17, the periphery 18 of which constitutes a gripping member adapted to co-act with the gripping member 14 for gripping the flange 10 and other elements between them.

Friction blocks 19 are interposed between the flange 14 and the ring 10, while friction blocks 20 are interposed between the flange 18 and said ring 10. The friction blocks may or may not be secured to the ring 10 or to their respective flanges, because it will soon be seen that other means have been provided for holding the friction blocks in place without the necessity of securing them either to said ring or to the flanges. It will now be evident that any mechanism which will force the sleeve 15 inward along the sleeve 12 will clamp the friction blocks 19 and 20 tightly against the ring 10, so that the sleeve 12 and consequently the shaft 5 will be effectively clamped or clutched to the sleeve 7 and shaft 6.

The mechanism for advancing the sleeve 15 toward the disk 13 or for withdrawing it therefrom is as follows: A desired number of toggle levers 21 are pivoted at the points 22 to the disk 17 and sleeve 15 or elements connected therewith. In the present case, each of the toggle levers has its inner end entered between a pair of webs 23 to which the pivotal connections are made. A collar 24 is threaded onto the sleeve 12, and is preferably split, so that a set bolt 25 may be used to tightly grip it at any desired position on the sleeve 12. By means of this construction said collar may be adjusted in or out on said sleeve until the exact desired position is reached. Each of the toggle levers is provided with a gripping contact face 26 and a releasing contact face 27. The former are adapted to engage the side face of the collar 24 when the outer ends of the toggle levers are forced out, and the latter of these contact faces are adapted to engage the periphery of said collar when the outer ends of the toggle levers are drawn in.

From the above it will be evident that any mechanism which will force the ends of the toggle levers outward will throw their contact faces 26 against the side face of the collar, and will thus force the sleeve 15 along on the sleeve 12 to thus effect the clamping operation.

A sleeve 28 is loosely mounted on the shaft, and can be advanced back and forth by means of a yoke or the like 29. Links 30 establish connections between this sleeve 28 and the outer ends of the several toggle levers. Obviously, forcing the sleeve 28 in toward the sleeve 12 will force the ends of the toggle levers outward to effect the clamping operation, while a retraction of the sleeve 28 away from the sleeve 12 will draw the ends of the toggle levers inward toward the shaft 5 without causing movement of the sleeve 15 until the contact faces 27 of the toggle levers engage the periphery of the collar 24. Thereafter any further movement of the sleeve 28 outward will effect a direct pull on the toggle levers to draw the disk 17 directly away from the disk 13.

Whenever the toggles are rotating, the levers 21 will be subjected to centrifugal force. This will tend to throw said levers outward away from the shaft, and will thus tend to effect a clutching operation at a time when the same is not desired. In order to overcome any such tendency, I provide springs or the like which tend to force the sleeve 28 outward along the shaft to thereby hold the toggle levers in against such centrifugal tendency, the amount of force thus exercised by said springs being just sufficient to properly balance the centrifugal tendency when operating at normal speed.

To accomplish the above result pockets or the like 31 are formed on the sleeve 28, springs 32 being placed in these pockets to act in the manner above described.

It was previously stated that one of the main objects of the invention was to inclose the friction blocks for the purpose of holding them in place and also for the purpose of protecting them against the ingress of dust and the like. In order to obtain the above results an annular flange 33 is formed on the disk 13, and annular flanges 34 and 35 are formed on the disk or ring 10. All of these flanges co-act together, and are so related to the friction flanges 14 and 18 as to almost completely inclose the friction blocks 19 and 20, such construction being well shown particularly in Fig. 1.

By means of the inclosing construction thus provided, the friction blocks are so held in place that it is unnecessary to rivet them or otherwise secure them to the metal rings. In this manner a considerable saving in expense and difficulty of construction is effected. A further advantage of this construction is that the wearing blocks will be properly held in place notwithstanding that they may be formed from sections or segments which set together to form the rings; that is, each ring may be made up of a number of sections of wood, for example, so cut that the grain of each section extends in a practically tangential direction, and it will be unnecessary to secure such sections to the metal.

A drum of metal sheeting or the like 36 surrounds the toggles, its inner end being secured to a flange 37 on the disk 17, and its outer end 38 extending to a point beyond the toggle levers. The said outer end is preferably beaded over as at 39, so that a rounded edge will be presented, and so as to stiffen the drum at this point. By leaving this protected drum open at its outer end access can be easily had to the toggles and other mechanism, and at the same time protection is afforded to workmen engaged in the vicinity of the clutch, and against the introduction of tools and the like into the moving parts.

In Fig. 3 I show a modified construction which makes use of all of the main features described in connection with the construction of Figs. 1 and 2. In the present case, however, the construction is peculiarly adapted to use at the end of a shaft, or on a stub shaft, where it is desired to clutch between such stub shaft and a pulley or the like. In the present case, a sleeve 40 is keyed or otherwise secured to the shaft 41, such sleeve extending to a point 42 beyond the end of the shaft. A flange 43 is formed on the sleeve 40, and its inner face constitutes an abutment against which one of the wearing rings or sets of blocks presses.

A sleeve 44 rotates with the sleeve 40 and is feather-keyed thereto, as by means of a feather-key 45. This sleeve has a flange 46, the inner face of which constitutes an abutment against which the other friction ring may press. A fly wheel or pulley 47 is mounted on a sleeve 48 which rotates freely on the sleeve 40. This sleeve 48 has annular ring portions 49 and 50 which portions coact with the flanges 43 and 46 to inclose between them annular spaces for the accommodation of the friction rings or blocks 51 and 52. An oil cup or the like 53 may be provided for insuring a free running of the pulley on the sleeve 40 when the mechanism is unclutched.

Obviously any mechanism which will force the sleeve 44 toward the flange 43 will clutch the pulley and therefore cause it to rotate with the sleeve 40 and the shaft 41. The mechanism for accomplishing this result is similar in all respects to that shown in Figs. 1 and 2. In the present case a split collar 54 is threaded onto the end portion 42 of the sleeve 40, a bolt 55 serving to clamp such split collar in place as in the previous construction. The toggle levers 56 have their inner ends pivoted to the webs 57 of the flange 46 at the points 58, in a manner similar to that previously described. These toggle levers act in the same way to force the sleeve 44 and flange 46 toward the flange 43, as in the previous case. To provide a simple construction for actuating the toggle levers, I have adopted the following arrangement of parts: A stub shaft 59 of comparatively small diameter is secured to the end of the main shaft. In the present case this is done by securing this stub shaft to a block 60 which abuts up against the end of the main shaft, seating into the end 42 of the sleeve 40 for this purpose, and being rigidly held in place by a lock nut or screw 61. This stub shaft 59 serves merely as a portion on which may be slidably mounted a collar 62 to which the links 63 which actuate the toggle levers are connected. In order to control the clutch it is simply necessary to slide the sleeve 62 in or out toward or from the sleeve 40. As a simple mechanism for controlling this movement, a hand wheel 64 has its inner ring 65 mounted within a groove of the sleeve 62, so that said hand wheel may be grasped and held against rotation even though the sleeve 62 be rotating rapidly. The hand wheel may then be forced directly in or out to control the clutching operation.

An annular ring 66 on the pulley serves to almost completely close the space in which the friction ring 51 is mounted, and an annular ring 67 of the flange 50 accomplishes a similar result with regard to the friction ring 52.

The construction shown in Fig. 4 is similar to that of Figs. 1 and 2, except in the present case the annular ring 33 on the flange 13 of Fig. 1 has been dispensed with, and in its place there has been substituted a flange 68 on the ring 10. By this construction the friction blocks are effectively held in place, as heretofore.

I desire to point out the fact that, although in the construction of Figs. 1, 2 and 3, the friction blocks are almost completely inclosed, still it is not necessary to inclose them completely, for the reason that dust and grit will have harmful effect chiefly when they are able to gain access to the wearing surfaces themselves. Therefore, in some cases, a construction such as that of Fig. 4 will serve effectively to prevent the access of dust and dirt to the wearing surfaces, because the wearing faces of the friction blocks are well protected.

From a study of the above constructions, it will be seen that in each case the wearing blocks are so inclosed by the friction flanges that they cannot fly out or be dislocated, notwithstanding the fact that they may not be riveted or otherwise secured to the friction flanges. I am familiar with clutch constructions in which the wearing portion is not riveted or otherwise secured to the friction flanges, but in all such cases the wearing material has been in the form of a complete circle, so that it has been held in place by reason of its own shape. However, there is considerable wastage in cutting or forming the wearing members as complete circles, much more in fact than is the case where they are made in sections or circular arcs. Furthermore, when the wearing material is cut in the form of a complete circle its grain will extend in a radial direction at some point and in a tangential direction at others. For this reason, the wear of such a friction block will be uneven, and the action will not be as even as otherwise. On the other hand, when the wearing member is in the form of a series of arc sections set together end to end, these sections can be cut so that the grain in each one will extend in a lengthwise direction, and consequently the direction of the grain will be tangential, or approximately so, throughout the entire circle. Therefore, the present clutch construction, in which inclosures are provided for retaining the sections against flying out, presents the advantage that the desirable qualities inherent in the use of a wearing member built up from a number of sections can be obtained without the disadvantage of having to rivet or otherwise secure such sections to the friction flanges.

I claim:

1. In a friction clutch, the combination of a driving member and a driven member, a clutch element secured to one of said members, a sleeve secured to the other member, a gripping element carried by the sleeve and lying to one side of the clutching element, a second gripping element slidably mounted with respect to the sleeve and in position to coact with the first mentioned gripping element for engaging the clutching element, an abutment on the sleeve and provided with gripping and releasing contact surfaces, a plurality of toggle levers pivotally carried by the slidably mounted gripping element, and provided with clamping and releasing contact faces for engaging the clamping and releasing surfaces of the abutment, and means for actuating the toggle levers to control the clutching operations, substantially as described.

2. In a friction clutch, the combination of a driving member and a driven member, an annular clutching element secured to one of said members, a gripping element secured to the other member and occupying a position to one side of the clutching element, a member slidably mounted with respect to said first mentioned gripping element, and having a second gripping element adapted to co-act with the first mentioned gripping element for engaging the clutching element, an abutment secured to the member on which the clutching elements are mounted and having side and peripheral contact surfaces, a plurality of toggle levers carried by the slidably mounted gripping element, and each having a clutching face for engaging the side of the abutment and a releasing face for engaging the periphery thereof, and means for actuating the toggle levers on their pivots for clutching purposes, substantially as described.

3. In a friction clutch, the combination of a driving member, a gripping element secured to the same, another gripping element slidably mounted with respect to the first mentioned gripping element, a driven member, a clutching element on the driven member between said gripping elements and adapted to be gripped by them, an abutment secured to said driving member, and provided with a side clutching surface and a peripheral releasing surface, a plurality of toggle levers pivotally carried by the slidably mounted gripping element, and each having a clutching contact face and a releasing contact face for engaging the clutching and releasing surfaces of the abutment respectively, and means for actuating the toggle levers for clutching and releasing purposes, substantially as described.

4. In a friction clutch, the combination of a driving member and a driven member, a gripping element secured to one of said members, another gripping element mounted on said member and slidable with respect to the first mentioned gripping element, a clutching element on the other member and occupying a position between the gripping elements and adapted to be gripped by them, an abutment secured to the member on which the gripping elements are mounted and provided with a side clutching surface and a peripheral releasing surface, a plurality of toggle levers pivotally carried by the slidably mounted gripping element, and each having a clutch contacting face and a releasing contact face for engaging the clutching and releasing surfaces of the abutment respectively, and means for actuating the toggle levers for clutching and releasing purposes, substantially as described.

5. In a friction clutch, the combination of a driving member and a driven member, a clutching element on the driven member, a gripping element secured to the driving member, a gripping element slidably mounted on the driving member, said gripping elements occupying positions on opposite sides of the clutching element of the driven member, means for actuating the slidably mounted gripping element for clutching purposes, friction blocks between the gripping elements of the driving member and the clutching element of the driven member, and inclosing flanges spanning the spaces between the clutching portions of the driving and driven members for retaining the friction blocks in position and inclosing them against the ingress of dust and the like, substantially as described.

6. In a friction clutch, the combination of a driving member and a driven member, a clutching element on one of said members, a gripping element secured to the other member, a gripping element mounted on said member and slidable with respect to the first mentioned gripping element, said gripping elements occupying positions on opposite sides of the clutching element, means for actuating the slidably mounted gripping element for clutching purposes, friction blocks between the gripping elements and the clutching element, and inclosing flanges spanning the spaces between the clutching portions of the driving and driven members for retaining the friction blocks in position and inclosing them against the ingress of dust and the like, substantially as described.

FREDERICK J. LEMLEY.

Witnesses:
FRANCES M. FROST,
THOMAS A. BANNING, Jr.